US006816886B2

(12) United States Patent
Elvanoglu et al.

(10) Patent No.: US 6,816,886 B2
(45) Date of Patent: Nov. 9, 2004

(54) MEASURING PERFORMANCE METRICS OF NETWORKED COMPUTING ENTITIES

(75) Inventors: Ferhan Elvanoglu, Redmond, WA (US); Carl Robert Bengtson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 10/177,470

(22) Filed: Jun. 21, 2002

(65) Prior Publication Data
US 2003/0177264 A1 Sep. 18, 2003

Related U.S. Application Data (63) Continuation of application No. 10/136,555, filed on May 1, 2002, now abandoned, which is a continuation-in-part of application No. 10/099,577, filed on Mar. 14, 2002.

(51) Int. Cl.[7] .............................................. G06F 15/16
(52) U.S. Cl. ...................... 709/206; 709/223; 709/224; 709/238; 709/242; 709/246
(58) Field of Search ................................. 709/200–203, 709/206, 223–225, 229, 236, 238–242, 245–246; 370/254, 351, 400

(56) References Cited

U.S. PATENT DOCUMENTS

| 6,003,079 | A | * | 12/1999 | Friedrich et al. | ........... 709/224 |
|---|---|---|---|---|---|
| 6,308,216 | B1 | * | 10/2001 | Goldszmidt et al. | ........ 709/236 |
| 6,314,093 | B1 | * | 11/2001 | Mann et al. | ................. 370/351 |
| 6,542,923 | B2 | * | 4/2003 | Nguyen | ...................... 709/206 |
| 6,708,137 | B2 | * | 3/2004 | Carley | ......................... 709/224 |
| 6,745,011 | B1 | * | 6/2004 | Hendrickson et al. | ... 455/67.11 |
| 6,754,470 | B2 | * | 6/2004 | Hendrickson et al. | ... 455/67.11 |

* cited by examiner

Primary Examiner—Bharat Barot
(74) Attorney, Agent, or Firm—Workman Nydegger (57) ABSTRACT

It is often desirable to measure performance metrics associated with computing entities such as, for example, computers, computer systems, computing devices, software modules, software layers, or the like. As disclosed, performance metrics regarding remote computing entities may be gathered remotely by routing a network message through specific computing entities of interest, and having the computing entities report performance metrics by adding entries into an editable portion of the network message. That editable portion does not include instructions to be executed by the destination computing entity, but is merely transplanted from the request to the response. In the response direction as well, the response may be routed as originally designated in the request, with each intermediary computing entity in the return path potentially adding an entry with performance metrics.

28 Claims, 4 Drawing Sheets

MEASURING PERFORMANCE METRICS OF NETWORKED COMPUTING ENTITIES

CROSS-REFERENCE TO RELATED APPLICATION

The present application claims priority under 35 U.S.C. 120 and is a continuation application to U.S. patent application Ser. No. 10/136,555 filed May 1, 2002, and entitled "Measuring Performance Metrics of Networked Computing Entities By Routing Network Messages" now abandoned, which patent application is a continuation-in-part of U.S. patent application Ser. No. 10/099,577, filed Mar. 14, 2002, and entitled "Using State Information In Requests That Are Transmitted In A Distributed Network Environment" still pending, which patent application claims priority from U.S. Provisional Application Ser. No. 60/275,809, filed Mar. 14, 2001, and entitled "Identity-Based Service Communication Using XML Messaging Interfaces", which applications are incorporated herein by reference in its entirety.

BACKGROUND OF THE INVENTION

1. The Field of the Invention

The present invention relates to the field of computer network performance monitoring. Specifically, the present invention relates to methods, systems and computer program products for measuring performance metrics of networked computing entities by routing network requests through the computing entities.

2. Background and Related Art

Computer networks have revolutionized our way of life by enhancing our ability to communicate and access information. One need only have access to an Internet-enabled computing device to be able to consume a wide variety of network services (e.g., e-mail communication, chat room participation, Web sites access, instant messaging, or the like) from all across the globe.

Often, there is a need to measure the performance of a network service. For example, when advertising a network service to the public, a network service provider often will advertise certain performance metrics that are important to a potential consumer. The network service provider thus would need to accurately measure the performance in order to give due diligence to truthful advertising.

Performance metrics of interest might include the number of "hits" a Web site has encountered, the number of access requests that have been serviced or rejected, or the like. In order to measure performance using conventional techniques, each service logs statistical metrics regarding its performance. Those metrics may then be entered into a statistical database and then provided to an aggregation engine that aggregates the statistical metrics to provide an overall statistical view of how the service is performing.

This conventional method does allow individuals to access performance information at some level to facilitate subsequent performance evaluation. However, this method often requires trained evaluators to come on site to periodically perform such testing. Also, such testing often focuses on a high-level view of system performance. Often, it would be advantageous to identify specific behaviors of components within the system, or even specific behaviors of software layers within the component.

Accordingly, what is desired are methods, systems and computer program products that allow more flexibility in how the performance of a network service is measured, and what performance information is acquired.

SUMMARY OF THE INVENTION

It is often desirable to measure performance metrics associated with computing entities. Such computing entities may be computers, computer systems, computing devices, software modules, software layers, or the like. In accordance with the principles of the present invention, performance metrics regarding remote computing entities may be gathered remotely by routing a network message through specific computing entities of interest, and having the computing entities report performance metrics by adding entries into the network message into an editable portion of the network message. That editable portion does not include instructions to be executed by the destination computing entity, but is merely transplanted from the request to the response when generated by the destination computing system. In the response direction as well, the response may be routed as designated in the request, with each intermediary computing entity in the return path potentially adding an entry with performance metrics.

The route may be designated using a path header in the header element of a Simple Object Access Protocol (SOAP) envelope. That SOAP envelope may be embedded within, for example, a HyperText Transport Protocol (HTTP) network message. The editable portion of the network message that may be edited by the intermediary and destination computing entities may be a unique eXtenstible Markup Language (XML) element that resides within the body element of the SOAP envelope. The network message is then issued to the destination computing system.

Since the intermediary and destination computing entities each have an opportunity to add performance metrics entries into the editable portion of the network message, and since the editable portion is transplanted from the request to the response, the editable portion of the response will include potentially many performance entries by the time the response is received back at either the original computing entity, or another delegated receiver of the response. Accordingly, by intelligently routing the network message, and by causing certain performance metrics to be gathered, one may intelligently evaluate performance metrics of network systems even remotely.

Furthermore, the computing entities are not limited to elements that have traditionally been evaluated for performance. Any computing entity that is capable of editing the editable portion may add performance metrics. Accordingly, not only may one obtain performance metrics about a particular computer, or computer system, but one may also obtain performance information regarding software modules, and even layers within those software modules.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to methods, systems and computer program products for measuring performance metrics of networked computing entities by routing network requests through specific intermediary computing entities to a destination computing entity. The request includes an editable portion that may be edited by any of the intermediary computing entities (or the destination computing entity) to include statistical performance information. The editable portion of the request does not include instructions to be executed by the destination computing entity. Instead, the destination computing entity generates a response that also includes the editable portion as it was received in the request, with potentially some performance statistics regarding the destination computing entity also being added.

In this description and in the claims, a "computing entity" is defined as any hardware or software module or modules (or a combination of one or more hardware and one or more software modules) capable of performing (or causing to be performed) one of more functions with the assistance of a processor. For example, a computing entity might include any computer (e.g., desktop, laptop, Personal Digital Assistant, mobile phone, or the like) that has one or more associated processors. In addition, any operating system, software application, software module, or software layer, may be considered a computing entity.

The embodiments of the present invention may comprise a general-purpose or special-purpose computer system including various computer hardware components, which are discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM, DVD, or other optical storage devices, magnetic disk storage or other magnetic storage devices, or any other media which can be used to carry or store desired program code means in the form of computer-executable instructions or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

Those skilled in the art will appreciate that the invention may be practiced in network computing environments with many types of computer system configurations, including personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

Figure 1:
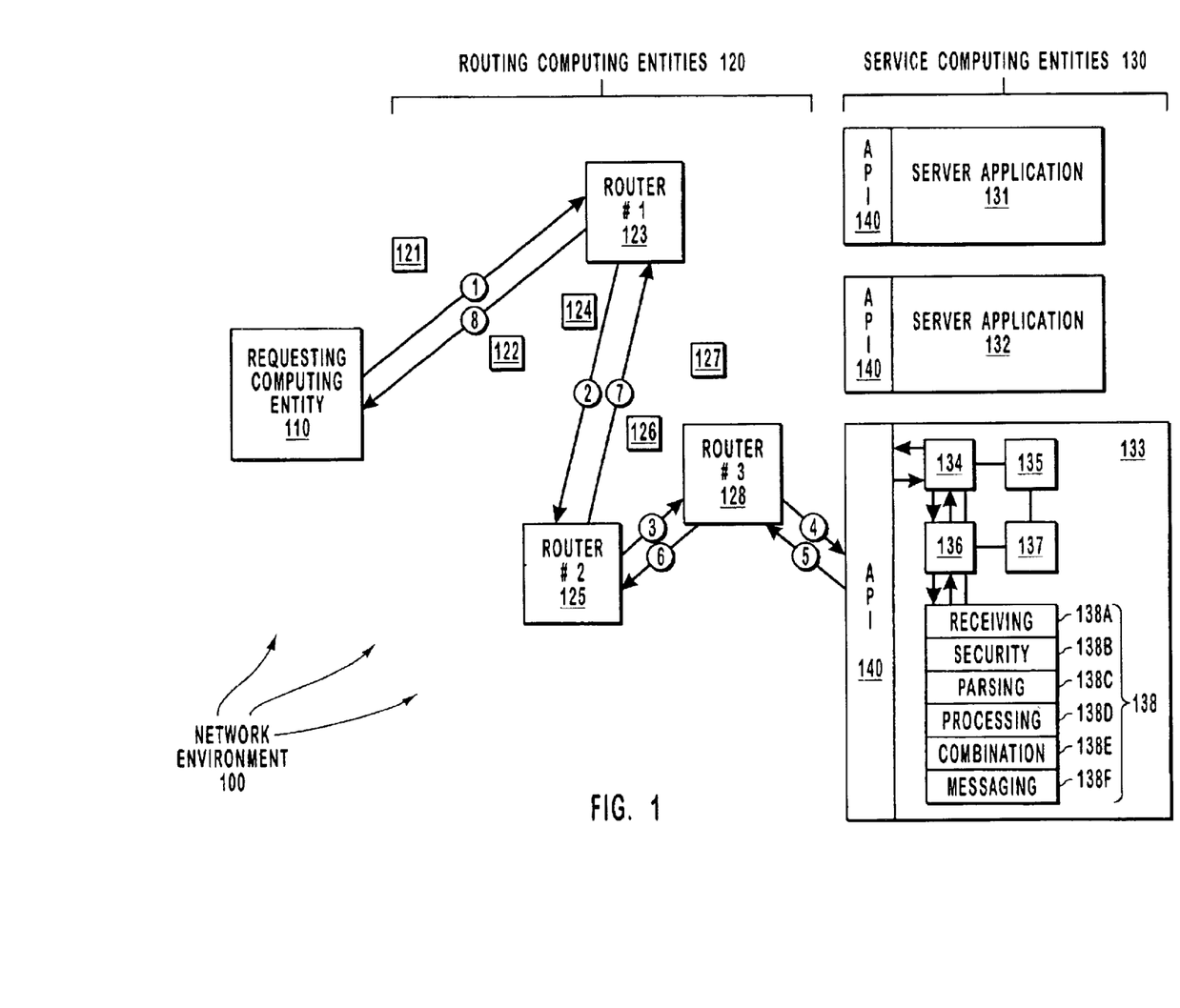
FIG. 1 illustrates an example network environment in which the present invention may operate.

FIG. 1 illustrates an example network environment 100 that represents a suitable environment in which the principles of the present invention may be employed. The network environment includes a requesting computing entity 110 that generates and issues a network request to one of the service computing entities 130. The service computing entity may be any computing entity that provides a service in response to a network request. The particular service computing entity to which the request is addressed will be often referred to herein as a "destination computing entity".

The network environment 100 also includes a number of intermediary computing entities 120 (also called herein "routing computing entities") through which the request may pass on its way to the destination computing entity, and through which a response to the request may pass on its way back to the requesting computing entity 110. The routing computing entities 120 may be any computing entity capable of routing network messages, and may be capable of performing functions in addition to routing.

The service computing entities 130 may include a number of server applications 131 and 132, as well as a service 133 that includes a number of individual computing entities in the form of modules 134 through 138 that interact so as to provide the service. Interaction with the various service computing entities 130 may occur via an Application Program Interface (API 140). The API 140 represents a set of rules governing how requests for services and responses thereto should be structured. While, the illustrated example has all of the service computing entities 131 through 133 communicating via a common API 140, that need not be the case.

The routing computing entities 120 include a number of intermediary computing systems or "routers" 121 through 128 that may receive a request, determine where the request should be routed, and then send the request to the next router. This process is repeated until the request arrives at its destination computing entity. Note that not all of the routers are employed when transferring requests and response.

In the illustrated example, the request passes from the requesting computing entity 110, through the router 123, through the router 125, through the router 128, and to the service computing entity 133. A response is transmitted back from the service computing entity 133, through the router 128, through the router 125, through the router 123, and to the requesting computing entity 110. This is just one example of the path a request and response might take. In this example, routers 121, 122, 124, 126 and 127 remain unused. This network environment 100 may be, for example, the Internet, which is globally dispersed. Alternatively, the network environment 100 may be another Wide Area Network (WAN) or even a Local Area Network (LAN).

Figure 2:
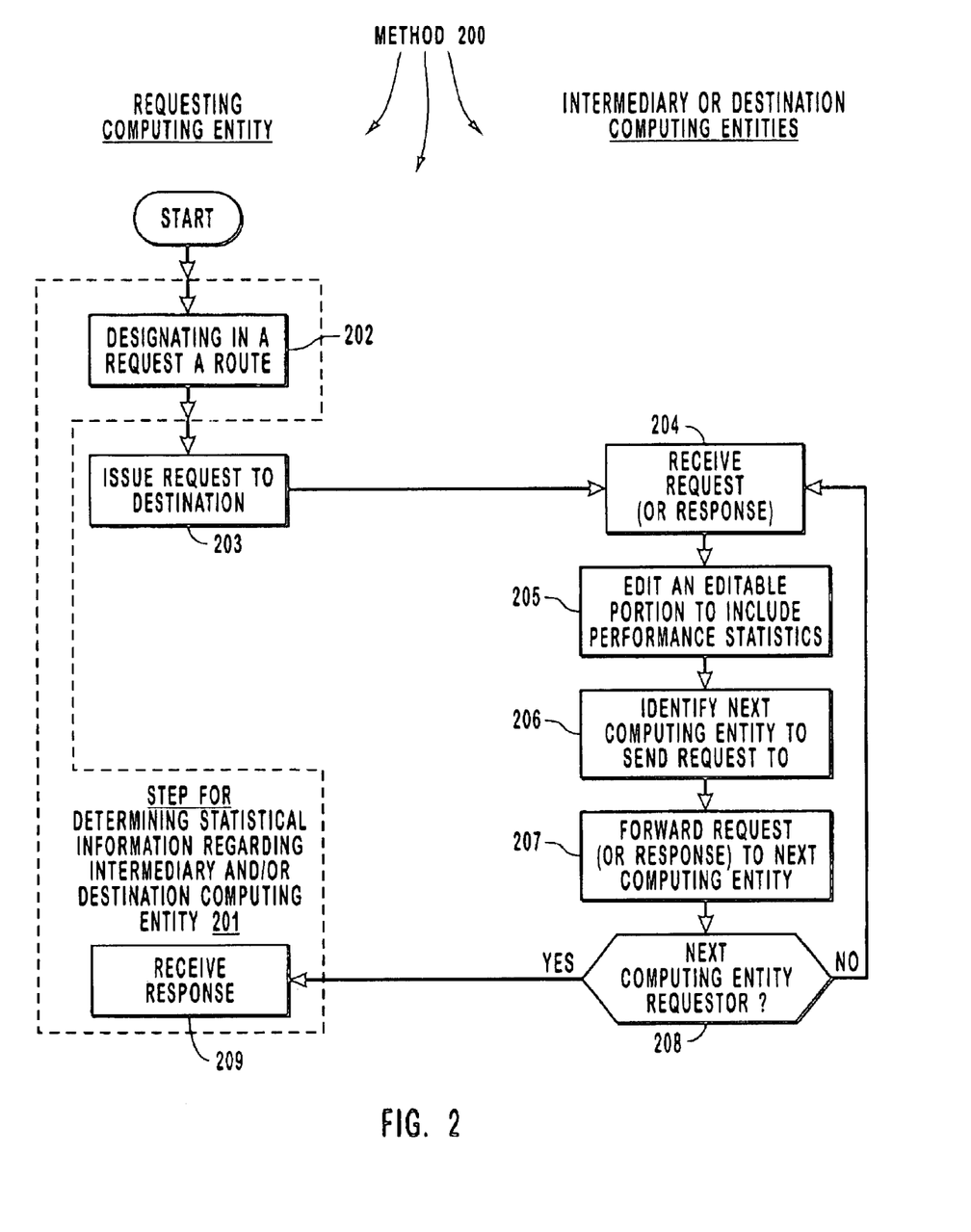
FIG. 2 illustrates a flowchart of a method for measuring the performance of a network service in accordance with the present invention.

FIG. 2 illustrates a flowchart of a method 200 for collecting statistical performance information concerning one or more computing entities that are network connected. For example, it may be desirable to test the performance of a destination computing entity such as the service computing entity 133 and/or perhaps one or more of the intermediary computing entities 121 through 128. Perhaps it may also be beneficial to measure performance characteristics associated with links in the network.

In FIG. 2, a step and several acts are performed by the requesting computing entity. That step and those acts are listed in the left column of FIG. 2 under the heading "REQUESTING COMPUTING ENTITY". Act performed by the intermediary computing entities and the destination computing entity may be very similar and are listed in the right column under the heading "Intermediary or Destination Computing Entities".

For example, suppose the service computing entity 133 is an e-mail messaging service located in Seattle. Now suppose that router #3 is implemented by a server in New York. For benchmarking purposes, one might like to determine how long it takes, in real time, to transmit a request from New York to Seattle. Using the principles of the present invention, one need not be in New York or Seattle to take such real-time measurements. Instead, the requesting computing entity 110 may be in Moscow. For example, the requesting computing entity 110 may belong to a third party from Moscow hired to independently measure how long it takes to transmit a network message from New York to Seattle at certain times of the day.

In this example, using the principles of the present invention, the requesting computing entity 110 in Moscow may send a request in the form of a network message addressed to the service computing entity 133 in Seattle. Normally, using conventional Internet protocols such as HyperText Transport Protocol (HTTP), such a request would be dynamically routed through the routing computing entities 120. This routing operation is typically designated to the routing layer. Application layers such as HTTP typically do not deal with the specific routing information. As a network message is passed down through the protocol stack, the routing layer assigns the first intermediary computing entity that the network message should travel through on its way to the destination computing entity. The routing layer then inserts the address of that first intermediary computing entity within a routing field that is accessible by routing layers in subsequent intermediary computing entity. The network message is then dispatched to the first intermediary computing entity.

When the first intermediary computing entity receives the network message, the message is passed up the protocol stack. The routing layer determines whether the first intermediary computing entity is the intended destination of the network message. If not the intended destination, the routing layer determines the next computing entity to send the network message to. If the next intermediary computing entity is already specified in the routing information, then the routing layer may simply use that information or, if network conditions warrant, may change the routing information to go around crowded, non-functional, or slower portions of the network. This process is repeated until the network message arrives at the destination computing entity. At that stage, the routing layer determines that the network message is intended for that computing entity, and passes the network message up the protocol stack to the application layer.

In all this, the routing is typically relegated to the routing layer, and is not available to the application layer. Accordingly, a user could not conventionally specify the particular route a network message should take as it passes through the Internet. However, in the example, a user associated with the requesting computing entity 110 may measure the network performance between a server in New York and a service computing entity 133 in Seattle by expressly providing that the request must traverse through the server in New York.

In accordance with the present invention and referring back to FIG. 2, the requesting computing entity (e.g., in Moscow) performs a functional, result-oriented step for determining statistical information regarding intermediary and/or the destination computing entity (step 201). This may be accomplished by any corresponding acts for accomplishing this function. However, in the illustrated example, this is accomplished via corresponding acts 202 and 209. Since the acts will be discussed sequentially, act 202 will now be described, while act 209 will be described further below.

Specifically, the requesting computing entity 110 designates in a request a route for the request to take on its way to the destination computing entity (act 202). This routing information identifies one or more intermediary computing entities that the request should be routed through. This routing information is identified at the application layer so that users may specify the routing information as they interface with a software application. Alternatively, such routing information may be accessed by the application from a database. One conventional technology that allows the application layer to designate routing information is called Simple Object Access Protocol (SOAP).

Figure 3A:
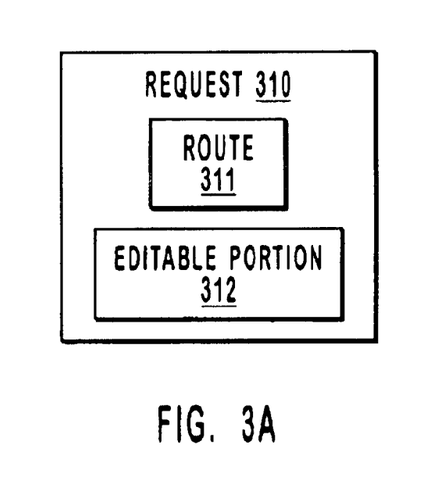
FIG. 3A schematically illustrates a data structure of a network request that contains an editable container that does not contain instructions for the destination computing entity.

FIG. 3A schematically illustrates a data structure that forms a network request 310. The network request 310 includes, among other things less relevant and not shown, a route field 311 that contains the routing information. In addition, the request 310 includes an editable portion 312 that may be edited without affecting the functioning of the destination computing entity. In other words, the editable portion 312 does not have computer-executable instructions that will be executed by the destination computing entity. Accordingly, although the editable portion 312 may be edited by the destination computing entity to list statistical performance information regarding the destination computing entity, the editable portion 312 does not control the destination computing entity regardless of the content of the editable portion. The editable portion 312 may be viewed as a logical container in which each intermediary computing entity and the destination computing entity may deposit performance information.

Figure 3B:
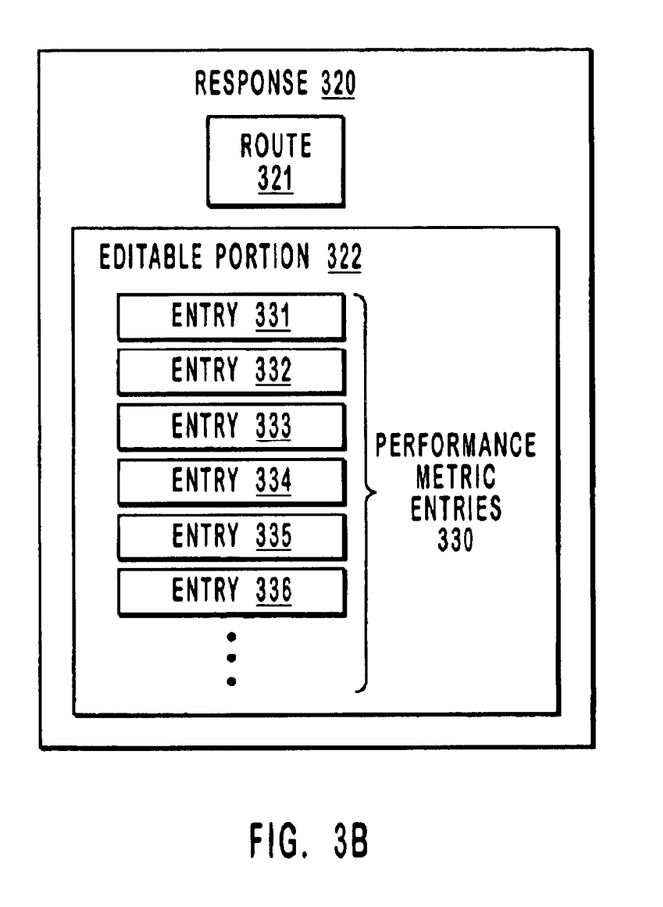
FIG. 3B schematically illustrates a data structure of a network response to the network request illustrated in FIG. 3A.

For example, FIG. 3B illustrates that the editable portion 312 may be transplanted from one data structure (e.g., request 310) to another (e.g., response 320). The editable portion 322 in the response 320 includes various performance metrics entries 330 including entries 331 through 336 among potentially many others as represented by the vertical ellipses. Each of the intermediary computing entities through which the request 310 passed may have inserted performance metric data as an entry into the editable portion. The destination computing entity may have also made an entry as it transplanted the editable portion into the response 320. Then, each computing entity through which the response 320 passes may also have an opportunity to insert performance metrics.

Consider now the example in which a third party Moscow company is monitoring the time it takes for network messages to travel between New York and Seattle at certain times of the day. In accordance with the principles of the present invention, the Moscow company may generate a request that designates that the request is to be routed through the server in New York and then to the e-mail service in Seattle, and that the response is to be routed through New York and back to the Moscow third party. The request may also indicate that each of the New York server and the Seattle e-mail service is to enter the received time for the request and response. Once the Moscow third party receives the response, the Moscow third party may evaluate the content of the editable portion 322 to calculate the network speed between New York and Seattle at the time the request and response were being processed.

Referring back to FIG. 2, after designating routing information (act 202) as well as including an editable portion in the request, the requesting computing entity issues the request to the destination computing entity (act 203). Recall again that the destination computing entity in the example illustrated in FIG. 1 may be the service computing entity 133. However, any of the computing entities contained within the service computing entity (e.g., service modules 134 through 138) may also be a destination computing entity. Furthermore, any of the software layers 138A through 138F may also be a destination computing entity. In an example that immediately follows, assume that the security layer 138B is the destination computing entity for purposes of discussion.

Any of the intermediary computing entities in the route (and the destination computing entity) will perform each of acts 204, 206 and 207 and optionally 205 as well. In particular, any of these computing entities may receive the network message (either as a request or a response) (act 204).

Then each of the intermediary or destination computing entities may edit the editable portion of the network message (act 205) by, for example, adding performance metrics entries to the editable portion. Then, the next computing entity to send the network message to is identified (act 206). Identifying the next computing entity may involve looking for the next intermediary computing entity in the routing field, or if there are no further intermediary computing entities listed, looking for the destination address to determine the next computing entity. However, the routing need not be static, but could be ad hoc as well. In particular, the intermediary computing entity may ignore the designated route under certain conditions. For example, the requesting computing entity may have been unauthorized to sent network messages to the next designated intermediary computing entity. Also, perhaps, the next intermediary computing entity is not functioning properly.

Finally, the computing entity forwards the network message to the next computing entity (act 207). Acts 204 through 207 are repeated as the request travels to its destination, and as the response travels back to the request (NO in decision block 208). Then, the requesting computing entity receives the response back (act 209) to complete the step for determining statistical information regarding intermediary and/or destination computing entities (step 201).

The following illustrates an example of a network request in the form of a SOAP envelope. The SOAP envelope contains much of the routing information. However, the body of the SOAP message includes an eXtensible Markup Language (XML) document that contains the editable portion of the network message. The example is as follows:

```
1.  <Envelope NAMESPACE DEFINITIONS>
2.     <Header>
3.        <path>
4.           <action>http://www.examplecompany.com/examplepath/request</action>
5.           <to>http://www.destination_computing_entity.com/</to>
6.           <fwd>
7.              <via>http://www.router#1.com</via>
8.              <via>http://www.router#2.com</via>
9.              <via>http://www.router#3.com</via>
10.          </fwd>
11.          <rev>
12.             <via>http://www.router#3.com</via>
13.             <via>http://www.router#2.com</via>
14.             <via>http://www.router#1.com</via>
15.          </rev>
16.       </path>
17.       <request REQUEST DEFINITION/>
18.       </request>
19.       <echoBack>
20.          ECHOBACK INFORMATION
21.       </echoBack>
22.    </Header>
23.    <Body>
24.       <insertRequest REQUEST ATTRIBUTES>
25.          REQUEST ELEMENTS
26.       </insertRequest>
27.    </Body>
28. </Envelope>
```

As is known to those of ordinary skill in the art, a SOAP envelope may be inserted into an HTTP request. The example listed above just shows a particular SOAP envelope that not only includes routing path definitions, but also includes a unique echoBack header in the body of the SOAP envelope. The echoBack content may include free-form XML that may be edited without affecting the nature of the request.

Line 1 of the example SOAP envelope is an opening tag that identifies the beginning of the SOAP envelope. Throughout the example XML documents that are listed herein, there are several terms (e.g., "NAMESPACE DEFINITIONS") that are capitalized. This is intended to convey that the capitalized terms describe what may be included at that portion of the XML element, rather than describing specific text.

For example, the "NAMESPACE DEFINITIONS" text illustrates where namespaces might be defined, and is provided in lieu of defining specific namespace definitions that are less relevant to the principles of the present invention and that will inevitably change depending on the application. As is known to those of ordinary skill in the art, namespace definitions typically correlate abbreviated identifiers to a formal identifier that identifies a hierarchical XML structure of a corresponding XML element. Although not listed in this example, opening tags and closing tags may typically include an abbreviated namespace identifier to allow applications to understand how the corresponding XML element should be interpreted.

Line 28 is a closing tag that identifies the end of the SOAP envelope. Interpreted together, lines 1 and 28 indicate that the material from lines 2 through 27 are the content of the SOAP envelope.

The SOAP envelope generally include two second-tier XML elements, a header element and a body element. Generally speaking, the header element primarily contains information that is structured in accordance with SOAP, while the body element may contain information that is structured by some other standard, whether now existing or to be developed in the future.

Line 2 represents the opening tag of the header element and corresponds to a closing tag at line 22. Accordingly, the material from line 3 through line 21 represents header information.

Line 3 is an opening tag for a path element that corresponds to a closing tag at line 16. Accordingly, the material from line 4 through line 15 represents path routing information and represents an example of the route field 311 illustrated in FIG. 3A. The fwd element from lines 6 through 10 represents the path that the request is to take on its way to the destination computing entity. Lines 7 through 9 indicate that the request is to travel first to the router #1 123 (see arrow one of FIG. 1), then to router #2 125 (see arrow two), and then to router #3 128 (see arrow three of FIG. 1) before finally being sent to the service computing entity 133 (see arrow four).

The rev element from lines 11 through 15 represents the path that the response to the request is to take on its way from the destination computing entity back to the requesting computing entity. Lines 12 through 14 indicate that the response is to travel first to the router #3 128 (see arrow five of FIG. 1), then to router #2 125 (see arrow six), and then to router #1 123 (see arrow seven of FIG. 1) before finally being sent to the requesting computing entity 110 (see arrow eight). Accordingly, the path element defines the network path that the request and response should take.

Line 17 and Line 18 are opening and closing tags, respectively, for a request element. This request element may include a "REQUEST DEFINITION" that defines the request in accordance with the SOAP standard.

Line 19 is an opening tag of an echoback header that corresponds to a closing tag at line 21. The material in between, in this case represented by the text "ECHOBACK INFORMATION" may include free-form XML elements that may be added to or otherwise edited by the intermediary or destination computing systems. The intermediary or destination computing systems may determine whether or not they should add performance metrics to the echoBack element based on information provided in the REQUEST ELEMENTS of line 25, the REQUEST ATTRIBUTES of line 24, the REQUEST DEFINITION of line 17, or in some other acceptable portion of the request message.

The last second-tier XML element of the SOAP envelope is the body element, which has an opening tag at line 23 and a closing tag at line 27. Accordingly, the material from line 24 and 26 represents body information that may be structured and contain elements that are not defined under the SOAP standard.

In this particular body element, there is an insertRequest element that has an opening tag at line 24 and a closing tag at line 26. The REQUEST ATTRIBUTES portion represents a place where request attributes may be placed when in conformance with the non-SOAP structural rules that define the insertRequest element. Similarly, the REQUEST ELEMENTS portion represents a place where request elements may be placed when in conformance with the non-SOAP structural rules that define the insertRequest element.

The following represents an example of a response to the request after various intermediary computing systems have added performance metrics to the echoBack element.

```
1.  <Envelope xmlns: NAMESPACE DEFINITIONS>
2.     <Header>
3.        <path>
4.           <action>http://www.examplecompany.com/examplepath/response</action>
5.           CORRELATION INFORMATION
6.           <fwd>
7.              <via>http://www.router#3.com</via>
8.              <via>http://www.router#2.com</via>
9.              <via>http://www.router#1.com</via>
10.          </fwd>
11.       </path>
12.       <echoBack>
13.          <Router#1> enter: 12:00:00.00</Router#1>
14.          <Router#2> enter: 12:00:00.65</Router#2>
```

-continued

```
15.      <Router#3> enter: 12:00:01.34</Router#3>
16.      <SCE133> enter: 12:00:02.13</SCE133>
17.      <Security 138B>
18.        <enterTime> 12:00:02.26</enterTime>
19.        <OtherPerfMetrics>
20.           Number of Request in Last 24 Hours: 1,432,166
21.           Number Successfully Authenticated: 0
22.           Number of Failed Authentications: 1,432,166
23.        </OtherPerfMetrics>
24.      </Security 138B>
25.      <Router#3> enter: 12:00:10.34</Router#3>
26.      <Router#2> enter: 12:00:11.01</Router#2>
27.    </echoBack>
28.   </Header>
29.   <Body>
30.    <insertResponse status="success">
31.      RESPONSE INFORMATION
32.    </insertResponse>
33.   </Body>
34. </Envelope>
```

The structure of this response is similar to the structure of the request except for a few items. Particular, the action in line 4 is identified as being a response, instead of a request. Line 5 also includes correlation information to correlate the response to the corresponding request. The path information from line 7 to line 9 is properly adjusted to show the routing from the perspective of a response. Lines 30 through 32 include response information that is appropriate given the substance of the request.

A significant difference may be observed in the form of the echoBack element. The echoBack element has been significantly enlarged due to the intermediary and destination computing entities inserting performance metrics entries. The echoBack element now extends from line 12 to 27. Lines 13, 14, 15 and 16 indicate the time the request entered the router #1 123, the router #2 125, the router #3, and the service computing entity 133, respectively (refer to FIG. 1). Lines 17 through 24 indicate more detailed performance metrics regarding the security layer 138B of the service module 138 of the service computing entity 133. In this case, the entry time for the security layer 138B is indicated in line 23. The information from line 20 through 22 gives an indication that the security layer 138B has rejected all authentication requests for the last 24 hours. This information might be helpful to diagnose problems with authentication. Using the principles of the present invention, the diagnoses may be made over long distances without requiring the physical presence of a trained professional. Lines 25 and 26 represent entry times for the response as entered router #3 128 and router #2 125 on its way back to the requesting computing entity 110. Note that there is no entry for router #1 as the response is passed back to the requesting computing entity 110, thereby illustrating that each intermediary computing entity need not necessarily provide a corresponding entry as the network message passes through.

From this latter example, not only may one have referred to the echoBack element to remotely diagnose problems with a security layer, but delivery timeliness between each of the routers may also have been measured at the same time. Accordingly, the principles of the present invention allow for efficient routing of network messages through intermediary computing entities, and allow for each of the computing entities to report information such as performance metrics into the network message. The information is then reported back to the requesting computing entity (or another designated computing entity) when the response to the request is returned.

Having now described the principles of the present invention in detail, it is noted that the precise hardware configuration that implements the above-described features is not important to the present invention. For example, it is not important to the principles of the present invention where the requesting computing entity 110, the intermediary computing entities 120, or the service computing entities 130 are located, or how such computing entities are structured.

Figure 4:
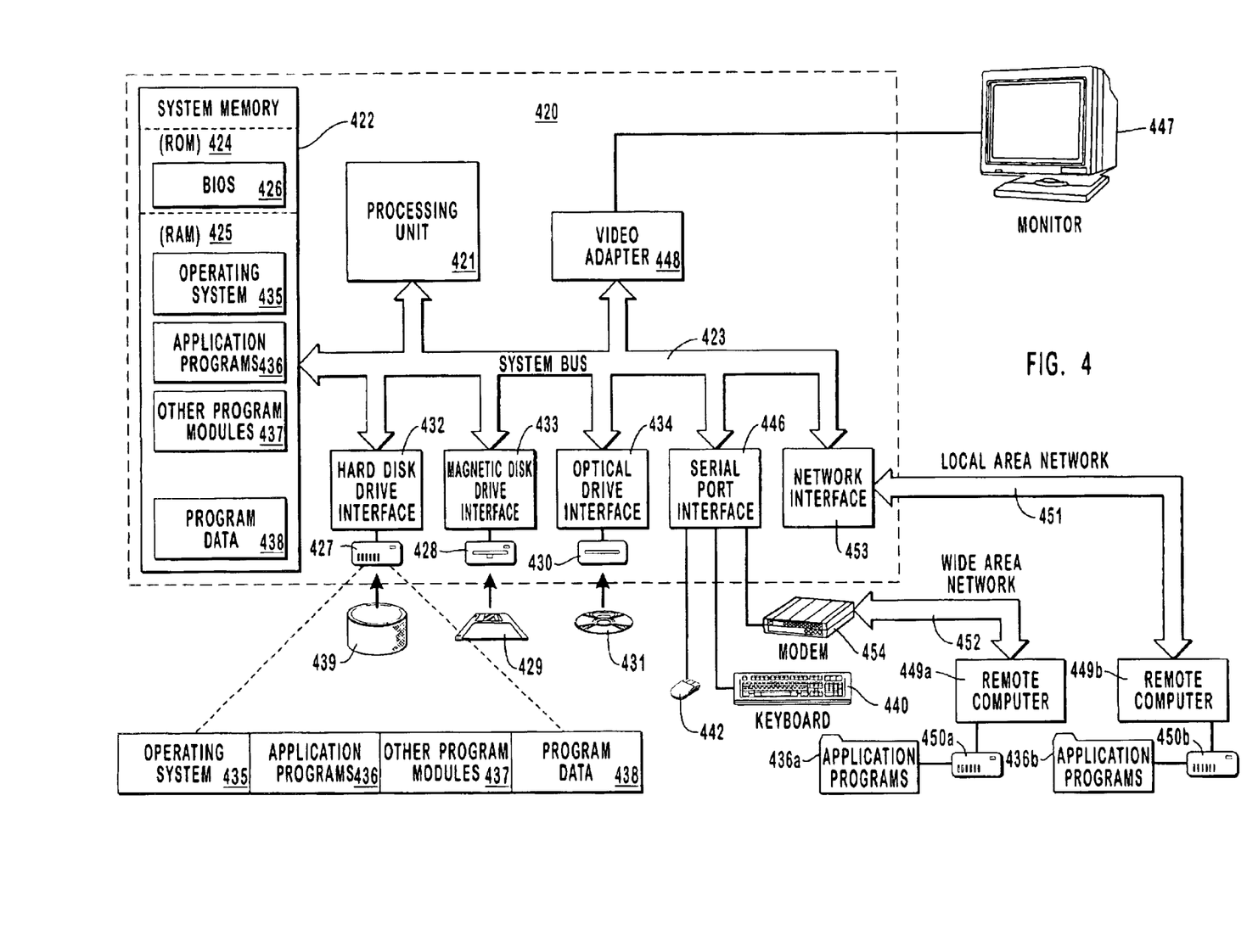
FIG. 4 illustrates a computing entity that may be used as one or more of the computing entities illustrated in FIG. 1.

Nevertheless, for the sake of completeness, FIG. 4 illustrates an example computing system that may itself or in combination with other computing devices implement all or portions of each of the computing entities described above. Also the computing system may execute software components that are also included within the definition of "computing entity" previously set forth.

The example system includes a general purpose computing device in the form of a conventional computing device 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438.

A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims are to be embraced within their scope.

What is claimed and desired secured by United States Letters Patent is:

1. In a computing environment that includes a plurality of computing entities, a method for collecting the statistical properties of one or more of the plurality of computing entities, the method comprising:

an act of designating in a request a route for the request to take on its way to a destination computing entity, the route identifying one or more intermediary computing entities that the request is to be routed through, the request including an editable portion that is configured to be edited without affecting the functioning of the destination computing entity;

an act of issuing the request to a destination computing entity; and an act of receiving a response to the request, the response including a response to the request as well as information in the editable portion regarding performance statistics concerning the one or more of the intermediary computing entities that was inserted by the one or more of the intermediary computing entities.

2. A method in accordance with claim 1, further comprising the following:

an act of receiving user input regarding the route, wherein the act of designating in a request a route for the request to take on its way to a destination computing entity, comprises an act of designating in the request the route for the request in response to the user input.

3. A method in accordance with claim 1, wherein the request is in the form of a first XML element.

4. A method in accordance with claim 3, wherein the editable portion is in the form of a second XML element that is descendant from the first XML element.

5. A method in accordance with claim 1, wherein the request is in the form of a SOAP envelope.

6. A method in accordance with claim 5, wherein the editable portion is in the form of an XML element contained within the body of the SOAP envelope.

7. A method in accordance with claim 1, wherein the act of issuing the request to a destination computing entity comprises an act of issuing the request within an HTTP network message.

8. A computer program product for use in a computing environment that includes a plurality of computing entities, the computer program product for implementing a method for collecting the statistical properties of one or more of the plurality of computing entities, the computer program product including one or more computer-readable media having stored thereon the following:

computer-executable instructions for designating in the request a route for the request to take on its way to the destination computing entity, the route identifying one or more intermediary computing entities that the request is to be routed through, the request including an editable portion that is configured to be edited without affecting the functioning of the destination computing device;

computer-executable instructions for causing the request to be issued to a destination computing entity; and computer-executable instructions for detecting the receipt of a response to the request, the response including a response to the request as well as information in the editable portion regarding performance statistics concerning the one or more of the intermediary computing entities that was inserted by the one or more of the intermediary computing entities.

9. A computer program product in accordance with claim 8, wherein the one or more computer-readable media are physical storage media.

10. A computer program product in accordance with claim 8, wherein the one or more computer-readable media further have stored thereon:

computer-executable instructions for detecting the receipt of user input regarding the route, wherein the computer-executable instructions for designating in a request a route for the request to take on its way to a destination computing entity, comprise the following:

computer-executable instructions for designating in the request the route for the request in response to the user input.

11. A computer program product in accordance with claim 8, wherein the computer-executable instructions for issuing the request to a destination computing entity comprise:

computer-executable instructions for issuing the request within an HTTP network message.

12. In a computing environment that includes a plurality of computing entities, a method for collecting the statistical properties of one or more of the plurality of computing entities, the method comprising the following:

an act of issuing a request to a destination computing entity, the request including an editable portion that is configured to be edited without affecting the functioning of the destination computing entity; and a step for determining statistical information regarding one or more intermediary computing entities that the request traverses on its way to the destination computing entity, the step including an act of receiving a response to the request as well as information in the editable portion regarding performance statistics concerning the one or more of the intermediary computing entities that was inserted by the one or more of the intermediary computing entities.

13. A method in accordance with claim 12, wherein the step for determining statistical information regarding intermediary computing entities that the request traverses on its way to the destination computing entity further 679 comprises the following:

an act of designating in the request a route for the request to take on its way to the destination computing entity, the route identifying the one or more intermediary computing entities that the request is to be routed through.

14. In a computing environment that includes a plurality of computing entities, a method for providing statistical properties regarding one of the computing entities, the method comprising the following:

an act of receiving a network message that designates a route for the request to take, the route identifying a group of computing entities including one or more intermediary computing entities that the network message is to be routed through as well as potentially a destination computing entity if the network message is a request, the network message being received at one of the computing entities in the group of computing entities or by the destination computing entity, the request including an editable portion that is configured to be edited without affecting the functioning of the destination computing device;

an act of editing the editable portion of the request to include statistical information regarding the performance of the computing entity;

an act of identifying the next computing entity to send the request to; and an act of forwarding the request to the next computing entity.

15. A method in accordance with claim 14, wherein the method is performed by a computer that has one or more associated processors.

16. A method in accordance with claim 14, wherein the method is performed at least in part by an operating system.

17. A method in accordance with claim 14, wherein the method is performed at least in part by a software application.

18. A method in accordance with claim 14, wherein the method is performed at least in part by a software module.

19. A method in accordance with claim 14, wherein the method is performed at least in part by a software layer.

20. A method in accordance with claim 14, wherein the method is performed by an intermediary computing entity.

21. A method in accordance with claim 14, wherein the method is performed by a destination computing entity, wherein the act of the receiving a network message comprises an act of receiving a request, wherein the act of forwarding the request to the next computing entity comprises an act of forwarding a response to the request to the next computing entity.

22. A method in accordance with claim 21, further comprising:

an act of transplanting the editable portion of the request to the response.

23. A computer program product including one or more computer-readable media having stored thereon computer-executable instructions for performing the acts recited in claim 14.

24. A computer program product in accordance with claim 23, wherein the one or more computer-readable media are physical storage media.

25. In a computing environment that includes a plurality of computing entities, a method for a providing statistical properties regarding one of the computing entities, the method comprising the following:

an act of receiving a request at a destination computing entity, the request designating a group of computing entities including one or more intermediary computing entities that a response to the request is to be routed through, the request including an editable portion that is configured to be edited without affecting the functioning of the destination computing device;

an act of transplanting the editable portion from the request to the response to the request;

an act of identifying a computing entity to send the response to; and an act of forwarding a response to the request to the computing entity.

26. A method in accordance with claim 25, further comprising:

an act of editing the editable portion to include statistical information regarding the performance of the destination computing entity.

27. A computer program product including one or more computer-readable media having stored thereon computer-executable instructions for performing the acts recited in claim 25.

28. A computer program product in accordance with claim 27, wherein the one or more computer-readable media are physical storage media.

* * * * *